(12) United States Patent
Radway (10) Patent No.: US 7,971,540 B2
(45) Date of Patent: Jul. 5, 2011

(54) CONTROL OF COMBUSTION SYSTEM EMISSIONS

(76) Inventor: Jerrold E. Radway, El Cajon, CA (US)

( * ) Notice: Subject to any disclaimer, the term of this patent is extended or adjusted under 35 U.S.C. 154(b) by 0 days.

(21) Appl. No.: 12/151,131

(22) Filed: May 3, 2008

(65) Prior Publication Data

US 2008/0286183 A1  Nov. 20, 2008

(30) Foreign Application Priority Data

Nov. 6, 2006  (WO) ................ PCT/US2006/043219

(51) Int. Cl.
*B01D 53/60* (2006.01)
*B01J 8/08* (2006.01)
*F23B 90/00* (2011.01)

(52) U.S. Cl. .......... 110/342; 110/203; 110/345; 241/21; 423/210; 423/230; 423/240 S; 423/244.07; 423/244.08

(58) Field of Classification Search ................ 423/210, 423/212, 213.2, 220, 222, 225, 230, 232, 423/544, 240 S, 244.07, 244.08; 252/181.6, 181.7, 183.16; 241/15, 18, 21; 110/230, 342, 345

See application file for complete search history.

(56) References Cited

U.S. PATENT DOCUMENTS

| | | | |
|---|---|---|---|
| 6,685,908 B1 * | 2/2004 | Yaniv | 423/432 |
| 2004/0018133 A1 * | 1/2004 | Radway | 423/244.05 |
| 2006/0106118 A1 * | 5/2006 | Husband et al. | 516/78 |

* cited by examiner

*Primary Examiner* — Wayne Langel
*Assistant Examiner* — Syed Iqbal
(74) *Attorney, Agent, or Firm* — Alfred J. Mangels

(57) ABSTRACT

A process for capturing undesirable combustion products produced in a high temperature combustion system. Very finely sized particles of alkaline earth carbonates or hydroxides, with or without added ground fly ash, are provided in slurry form and are injected into the high temperature zone of a furnace. The particles flash calcine to provide substantially unagglomerated particles having a particle size of less than about 0.5 microns to capture and neutralize SOx, NOx, and toxic chemicals.

3 Claims, 4 Drawing Sheets

Large particle forms CaSO₄ shell around CaO core

Small particle reacts more completely

EFFECT OF PARTICLE SIZE ON SURFACE AREA AND NUMBER OF PARTICLES

| Particle Diameter – microns | Surface Area per unit weight relative to 44 microns (325 mesh) | Number of Particles per unit weight, relative to 44 microns |
|---|---|---|
| 44 | 1 | 1 |
| 20 | 2.2 | 11 |
| 10 | 4.4 | 85 |
| 2 | 22 | 10,600 |
| 0.5 | 88 | 676,000 |

FIG. 3

Large particle forms $CaSO_4$ shell around CaO core

Small particle reacts more completely

FIG. 5

PARTICLE SIZE, SPECIFIC SURFACE AREA, AND EMLEY PLASTICITY DATA OF 25 DIFFERENT COMMERCIAL HYDRATED LIMES

| Lime No. | Emley Plasticity Value | Geometric Weight-Mean Diameter - microns | Geometric Standard Deviation | Specific Surface - $m^2/g$ |
|---|---|---|---|---|
| 1 | 60 | 6.0 | 1.9 | 0.50 |
| 2 | 80 | 4.2 | 3.1 | 1.20 |
| 3 | 80 | 4.6 | 2.7 | 0.90 |
| 4 | 80 | 5.6 | 2.2 | 0.60 |
| 5 | 80 | 5.8 | 2.4 | 0.70 |
| 6 | 80 | 6.0 | 2.2 | 0.50 |
| 7 | 110 | 4.4 | 2.5 | 0.90 |
| 8 | 120 | 3.3 | 3.0 | 1.40 |
| 9 | 120 | 5.4 | 2.2 | 0.70 |
| 10 | 140 | 3.7 | 6.1 | 3.60 |
| 11 | 220 | 7.4 | 3.9 | 0.90 |
| 12 | 240 | 7.8 | 3.4 | 0.70 |
| 13 | 280 | 4.0 | 2.5 | 0.90 |
| 14 | 300 | 5.0 | 3.4 | 1.10 |
| 15 | 310 | 6.6 | 3.6 | 0.80 |
| 16 | 320 | 7.2 | 2.8 | 0.60 |
| 17 | 400 | 6.3 | 2.8 | 0.70 |
| 18 | 400 | 7.2 | 4.9 | 1.20 |
| 19 | 410 | 7.5 | 4.5 | 1.00 |
| 20 | 420 | 5.2 | 2.9 | 0.80 |
| 21 | 420 | 6.8 | 4.4 | 1.00 |
| 22 | 480 | 4.1 | 3.0 | 1.10 |
| 23 | 490 | 3.0 | 10.5 | 11.00 |
| 24 | 550 | 4.9 | 2.6 | 0.80 |
| 25 | 600 | 2.9 | 2.1 | 1.10 |

FIG. 4

| Rank | Low Volatile Bituminous | High volatile Bituminous | | | | Sub-bituminous | Lignite |
|---|---|---|---|---|---|---|---|
| Seam | Pocahontas No. 3 | No. 9 | Pittsburgh | No. 6 | | | |
| Location | West Virginia | Ohio | West Virginia | Illinois | Utah | Wyoming | Texas |
| Ash, dry basis, % | 12.3 | 14.10 | 10.87 | 17.36 | 6.6 | 6.6 | 12.8 |
| Sulfur, dry basis, % | 0.7 | 3.30 | 3.53 | 4.17 | 0.5 | 1.0 | 1.1 |
| Analysis of ash, % by wt. | | | | | | | |
| $SiO_2$ | 60.0 | 47.27 | 37.64 | 47.52 | 48.0 | 24.0 | 41.8 |
| $Al_2O_3$ | 30.0 | 22.96 | 20.11 | 17.87 | 11.5 | 20.0 | 13.6 |
| $TiO_2$ | 1.6 | 1.00 | 0.81 | 0.78 | 0.6 | 0.7 | 1.5 |
| $Fe_2O_3$ | 4.0 | 22.81 | 29.28 | 20.13 | 7.0 | 11.0 | 6.6 |
| CaO | 0.6 | 1.30 | 4.25 | 5.75 | 25.0 | 26.0 | 17.6 |
| MgO | 0.6 | 0.85 | 1.25 | 1.02 | 4.0 | 4.0 | 2.5 |
| $Na_2O$ | 0.5 | 0.28 | 0.80 | 0.36 | 1.2 | 0.2 | 0.6 |
| $K_2O$ | 1.5 | 1.97 | 1.60 | 1.77 | 0.2 | 0.5 | 0.1 |
| Total | 98.8 | 98.44 | 95.74 | 96.20 | 97.5 | 86.4 | 84.3 |

FIG. 6

Comparison of ash from two lignites with wood ash

| | Lignite-type Ash | Lignite-type Ash | Wood Ash |
|---|---|---|---|
| Ash, dry basis, % | 5.0 | 6.0 | 1.0 |
| Sulfur, dry basis, % | 1.0 | 1.0 | 1.0 |
| Analysis of ash, % by wt. | | | |
| $SiO_2$ | 17.9 | 18.9 | 33.8 |
| $Al_2O_3$ | 13.2 | 19.5 | 2.6 |
| $TiO_2$ | 0.5 | 0.6 | 0.2 |
| $Fe_2O_3$ | 6.0 | 6.4 | 1.6 |
| CaO | 59.7 | 40.8 | 56.5 |
| MgO | 2.0 | 12.7 | 4.7 |
| $Na_2O$ | 0.2 | 1.0 | 0.5 |
| $K_2O$ | 0.5 | 0.1 | 0.1 |
| Total | 100.0 | 100.0 | 100.0 |

FIG. 7

CONTROL OF COMBUSTION SYSTEM EMISSIONS

TECHNICAL FIELD

The present invention relates to processes for improved operation of coal-fired and other carbonaceous-fuel-fired electrical utility boilers, incinerators, and high temperature combustion reactors. More particularly, the present invention relates to cost effective processes for reducing fouling of carbonaceous-fuel-fired combustion system components, reducing corrosion within such systems, and reducing undesirable and noxious stack emissions.

BACKGROUND ART

In coal-fired power generating plants, as well as in other industrial processes involving combustion of coal, a number of the products of the combustion process include compounds that have an adverse influence on boiler operation, or they are environmentally undesirable and the discharge of which into the environment is subject to environmental regulations. Such compounds include sulfur oxides ($SO_x$), nitrogen oxides ($NO_x$), hydrochloric acid, and such heavy metals as mercury, arsenic, lead, selenium, and cadmium. Additionally, a significant number of nations, including the European Union and Japan, have taken steps to further limit the emissions of carbon dioxide ($CO_2$), and similar steps have been proposed in the United States but are currently being implemented by few of the 50 states.

In order to meet environmental limitations affecting the discharge into the atmosphere of the most prevalent of the most widely regulated compounds, sulfur dioxide ($SO_2$), combustion products from such plants and processes are commonly passed through flue gas desulfurization (FGD) systems. The treatment of flue gases to capture $SO_2$ is often effected in lime- or limestone-based wet scrubbers, in which lime or limestone slurries contact the flue gases before they are discharged into the atmosphere. The sulfur oxides are thereby chemically converted into insoluble calcium compounds in the form of calcium sulfites or sulfates. The sulfur oxides contained in such combustion products are thus converted into less-environmentally-harmful compounds that are either disposed of in landfills, or, when suitably modified or treated, are sold as marketable chemicals as a result of their conversion into marketable gypsum.

Although useful for converting some sulfur oxides, the widely-used types of lime/limestone scrubbers are not very effective in capturing the 1% to 1.5% of the sulfur in the fuel that is transformed during the combustion process into gaseous sulfur trioxide ($SO_3$), which can escape from the scrubber. The $SO_3$ poses operating problems within the boiler itself, in that it leads to corrosion and fouling of low temperature heat exchange surfaces. Additionally, it poses environmental problems in that unless it is captured or transformed, the $SO_3$ results in a persistent, visible plume and the discharge of corrosive and potentially hazardous sulfuric acid mist. Further complicating the matter, selective catalytic reactors (SCR's), which are available and because of high capital costs are installed primarily in the larger, newer such plants to comply with nitrogen oxide emission regulations, essentially cause a doubling of the amount of $SO_3$ that is generated. Consequently the already serious operational and environmental problems caused by the presence of $SO_3$ are magnified.

The $SO_3$ emission problem has been addressed chemically using a variety of alkaline chemicals (wet and dry) that are injected into the system at many different points in the flue gas flow path. Lime or limestone injected into the high temperature region of the boiler can be effective in capturing the $SO_3$, but the commercial materials that are generally utilized tend to magnify boiler deposit problems and increase the quantity of particulates that can escape from the electrostatic precipitators (ESP's). The adverse impact on the precipitators is also encountered when lime or lime hydrate is injected as powders into the lower temperature region downstream of the SCR's. On systems with scrubbers capable of capturing particulates, the precipitator problem can be circumvented by injecting the lime downstream of the precipitator. However, fine powders tend to become agglomerated during the course of handling and result in relatively inefficient $SO_2$ capture, thereby necessitating dosage at several times stoichiometric. Further, the injection of slurries downstream of the ESP pose serious problems relative to drying and deposit buildup in the ducts, because the low temperatures at that point do not provide the evaporative driving force that is needed to quickly flash off the water.

Sodium compounds, such as the bisulfite, carbonate, bicarbonate and carbonate/bicarbonates (Trona) compounds, have also been injected into the cooler regions of the system and are effective in $SO_3$ capture. However, they pose material handling, ash disposal, and potential deposit problems. They also tend to have poor utilization efficiencies unless they are ground to very fine particle sizes. Relatively coarse particles are prone to formation of an outer sulfate shell, thereby inhibiting utilization of the unreacted chemical inside the shell. Additionally, grinding of such materials is expensive, and it creates storage and handling problems because of the fineness and hygroscopic nature of the particles. Ash disposal issues arise because of the solubility of sodium compounds, and in some cases steps to insure containment in the disposal ponds may be required.

Commercially available, but relatively expensive, oil-based magnesium additives can be effective in $SO_3$ capture. In that regard, one of the most effective chemical techniques for controlling both ash-related fouling in the boiler, and also the corrosion and emission problems associated with $SO_3$ generated in solid-fueled boilers, is the injection into the upper region of the boiler of oil slurries of MgO or $Mg(OH)_2$. That technology was originally developed for use with oil-fired boilers in which the magnesium-based oil suspension was usually metered into the fuel. It was later applied to coal-fired boilers. The most widely accepted mode of application of such additives today is by injection of slurries of MgO or $Mg(OH)_2$ into the boiler above the burners and just below the region at which a transition from radiant heat transfer to convective heat transfer occurs.

Another approach to $SO_3$ capture involves the use of so-called "overbased" organic-acid-neutralizing additives of the type that are included in motor oils and as fuel oil combustion additives. Those additives are actually colloidal dispersions of metallic carbonates, usually magnesium or calcium. When burned with the fuel, they are effective at near stoichiometric dosage in capturing $SO_3$ and in mitigating ash deposits caused by vanadium and/or sodium in the oil. The colloids are stabilized by carboxylic or sulphonate compounds and are known to provide mostly particles in the Angstrom range. Though very expensive, the "overbased" compounds are widely used at low dosages to capture vanadium in heavy-oil-fired combustion turbines. Although they have been utilized in $SO_3$ capture efforts, there have been no prior reports of their use for capturing either $SO_2$ or toxic metals.

Although emissions benefits can be obtained by the use of the so-called "overbased" compounds, their much higher cost and combustibility make them a less attractive option for most applications. Additionally, the combustibility of the over-based materials requires hard piping as well as additional safety devices, each of which involves increased costs.

In addition to oil-based slurries, $Mg(OH)_2$ powders and water-based slurries have also been utilized as fireside additives in boilers, but because of their generally coarser particle size they are less efficient in capturing the $SO_3$. Water slurries of MgO have also been injected through specially modified soot blowers installed on oil and Kraft-liquor-fired boilers, in which they moderated high temperature deposits but had only a nominal impact on $SO_3$-related problems because of an inability to apply the chemicals continuously.

In addition to limitations on $SO_x$ emissions, regulations aimed at controlling mercury emissions from coal-fired boilers have been promulgated by regulatory authorities, and regulations applicable to other toxic metals are anticipated eventually. A considerable amount of research aimed at finding practical techniques for capturing such toxic metals has shown that high-surface-area solids can capture a significant portion of mercury by adsorption, if the mercury is in an oxidized form rather than in an elemental form. Oxidants, either added to or naturally present in the fuel, such as chlorides, can facilitate the oxidation. Although high-surface-area lime can be effective in mercury capture, the usual commercial products can result in operational problems in the form of ash deposits and increased stack emissions. The most widely accepted way to achieve mercury capture has been the injection of expensive activated carbons in the cooler regions of the boiler gas path.

Combustion systems requiring additional emission control generally fall into two broad groups. The first group includes those systems that are sufficiently large and are sufficiently new to justify the large capital investment in scrubbers for $SO_2$ and in selective catalytic reactors (SCR's) for $NO_x$. The second group includes those systems that are older and smaller, and for which scrubbers and/or SCR's are difficult to physically retrofit and involve a major capital investment that is often difficult in to justify economically.

In the second group of systems, $SO_2$ emission regulations are currently being met by switching to more costly, low-sulfur fuels and/or by utilizing market-based emissions credits. Combustion process modifications have also been used successfully to reduce $NO_x$ emissions, but the reduction is often insufficient to bring the systems into compliance with the latest regulations. Those systems may also generate a byproduct fly ash that is higher in unburned carbon as a result of combustion modifications that are aimed at minimizing $NO_x$ formation. The efficiency loss as a result of the increased unburned carbon is small, typically less than about 0.5% of the fuel carbon, but if the amount of unburned carbon in the ash is too high (>5% of the ash), the ash becomes unmarketable, thereby converting a potential revenue stream from the sale of ash into an expenditure for ash disposal. Considerable work has gone into optimizing the burners of such systems, but with limited success. Because limiting $NO_x$ emissions is an important objective, techniques for separating the carbon from the ash are being pursued as an alternative.

The larger, newer systems can justify the major investment in SCR's, while the smaller, older systems tend to use selective non-catalytic reduction (SNCR), which employs similar reactions to the SCR's using ammonia or an amine, but without the catalysts. Both of those control technologies result in a small amount of ammonia in the flue gas downstream of the SNCR or SCR systems. The ammonia can react with the $SO_3$ that results from the combustion process to form low-melting-point ammonium bisulfate, which can foul air preheaters that are further downstream in the flue gas flow path.

Both groups of combustion systems are likely to be required to conform with additional regulations that require the capture of trace quantities of toxic metals. Despite gas scrubbing, the scrubber/SCR-equipped systems that utilize higher sulfur content fuels also face a new, stack opacity problem that results from a doubling by the SCR's of the $SO_2$ that is catalyzed to $SO_3$ and is emitted as a visible, sulfuric acid mist plume. The acid in the flue gas also results in system operating problems by plugging and corroding lower temperature components of the system.

The sulfuric acid plume problem has resulted in major environmental public relations issues for utilities, as evidenced by American Electric Power Company's purchase of the town of Cheshire, Ohio, because of acid mist discharge issues. The Department of Energy has spent millions of dollars in testing various $SO_3$ control techniques, and a variety of acid-neutralizing systems are being installed. Some systems are currently operated only during the $NO_x$ season, that part of the year when $NO_x$ controls must be employed (currently May through September). Those $SO_3$ mitigation systems utilize a variety of alkaline chemical compounds that are injected at various points in the flue gas path to effect the acid neutralization. Most of those chemicals, including $Ca(OH)_2$, $Mg(OH)_2$, Trona, and SBS (sodium bisulfite), are relatively coarse in particle size, with the finest-sized particles tested reportedly having a particle size of about 3 microns. However, those chemical compounds are difficult to deploy, they are utilized at rates that are 3 to 12 multiples of stoichiometric, and their use involves significant costs. Although the use of furnace injection of those coarser particles as an emissions control vehicle has been evaluated extensively, most current installations feed chemicals for $SO_3$ control in the cooler section of the system at a point downstream of the SCR's, either as powders, slurries, or solutions.

It is likely that the remaining boiler systems and combustion systems without scrubbers will soon need to meet more stringent $SO_2$ regulations or face early shutdown if a practical, low capital cost, moderate operating cost, pollution control system does not become available. Those same power plants will soon also be required to capture mercury and other toxic metals, as well as to deal with more stringent $SO_x$ and year round $NO_x$ emission limitations.

Considerable research has been conducted on techniques for capturing the toxic metal pollutants before they can escape from the combustion system and/or damage the SCR catalyst. That research has shown that the injection at various points in the boiler of finely sized, high-porosity, high-surface-area particulate materials, such as specially modified CaO, silicates, MgO, or activated carbon can help to capture most of the metals. Heavy metals (Hg, Se, and As) capture has been shown to be significant when lime is injected into the high temperature region at twice the sulfur stoichiometric ratio, even though the surface area of the injected materials is relatively modest, of the order of about 1 to 4 $m^2/gm$ or more, and even though competition exists for that same reagent/reactant surface area by the acid-forming gases. The current regulatory focus is on the capture of mercury, and the current user focus is on injection into the cooler regions of the boiler of expensive, high-surface-activated carbon. However, the adverse operating and environmental impacts of the other toxic metals will eventually lead to emissions regulations for the other toxic metals.

$SO_2$ control utilizing powdered limestone injection into the high temperature furnace, a technology known as LIMB (Limestone Injection Multistage Burner), has been investigated extensively since the 1970's. However, that approach has not been widely implemented because treatment rates twice stoichiometric with −325 mesh powders (typical mean particle size of about 20 microns) captured no more than about 65% of the $SO_2$. That approach also dramatically increases the ash burden (as much as double). And it has posed deposit problems in the boiler convective pass, requiring near continuous operation of the soot blowers, and has overburdened the particulate control device. Much of the research effort has focused on the creation of high-porosity, high-surface-area CaO by flash calcination of the limestone in the furnace. However, the desired improvement in chemical utilization efficiency has not been achieved because of the plugging of the pores of the high-porosity particles with $CaSO_4$, thereby reducing the accessible surface area for reaction and leaving a core of unreacted CaO. Some work with particle sizes in the 5 micron range has been reported, but that approach also has not been utilized commercially because of the pore-plugging problem, along with what is perceived to be a high cost of grinding limestone into a fine particle size.

With regard to $SO_3$ capture, the University of North Dakota Energy and Environmental Research Center recently reported that the tiny fraction, less than about 1.5%, of submicron-size ash particles that are present in fly ash have been found to adsorb $SO_3$. It suggested that the fraction of those particles is important for controlling the $SO_3$ problem. The addition of fine alkaline materials (under 5 microns) was also mentioned. Other workers have reported that fly ash will absorb toxic metals, but its low surface area leads to poor capture efficiency.

Finally, the possibility of modifying combustion conditions to increase the fraction of submicron size particles has not been reported. Instead, the focus has been on adding excessive amounts of what are perceived as fine, ground limestone (−325 mesh) having a median particle size of around 20 microns. The reason for that focus is that limestone is inexpensive, and even if one were to desire smaller particles the normal techniques for providing very fine particle sizes having high-surface-areas have all been judged to be too expensive.

Some research has been conducted on what might be described as a multi-pollutant control process simulating the furnace injection of calcium and magnesium compounds slurried in solutions of nitrogen compounds. Theoretically, the combination would address all the emission issues except $CO_2$. Although the injection of nitrogen solutions to control $NO_x$ is in wide use on power boilers, the combination with calcium slurries for simultaneous $SO_2$ capture has not been commercially adopted. Reportedly, the failure to do so is the result of problems with settling and pluggage in the slurry injection systems.

Reducing $CO_2$ emissions has thus far not been the subject of regulations in much of the world. Emphasis has been placed on improving efficiency of fuel use. And research on sequestering the $CO_2$ is ongoing, with some $CO_2$ captured, liquefied, and used in enhancing oil recovery. Most of the commercial SOX emissions control processes for fossil-fueled combustion systems employ limestone (directly or as lime) with the net result being a significant secondary emission of $CO_2$. The scrubbers employing limestone on the larger, newer units are the lowest emitters (about 0.7 ton $CO_2$/ton of $SO_2$ captured) while those using lime have net emissions at least twice as high because of the thermal loss in the calciners. Because the utilization of the limestone is so poor with conventional Furnace Sorbent Injection (FSI), the $CO_2$ released per ton of $SO_2$ captured is nearly 14 tons/per ton.

It is therefore an object of the present invention to provide improved processes by which boiler operational and emissions problems can be reduced more economically than is attainable by presently utilized methods.

DISCLOSURE OF INVENTION

Briefly stated, in accordance with one aspect of the present invention, a reduction of undesirable combustion system emissions, primarily $SO_x$ and toxic metals, but also $CO_2$, $NO_x$, and unburned carbon, is achieved by preparing an essentially agglomerate-free, high-solids-content aqueous slurry containing $CaCO_3$, $Ca(OH)_2$, $MgCO_3$, or $Mg(OH)_2$ particles having a particle size of about one to two microns or smaller. The method of the invention includes injecting the slurry into the boiler furnace at temperatures sufficient to flash calcine the alkaline earth compounds to still smaller size oxide particles. Both the ratio of water to solids and the point of injection can be selected to limit the temperature exposure of the product oxide and thereby limit grain coalescence.

The present invention is also directed to:

1. the incorporation of alkali-type dispersants or high-melting-point alkali compounds to offset the adverse impacts on the ESP of the alkaline earth scavenging agents for capturing $SO_2$;

2. the addition of soluble chlorides to freeze condition the dispersion and, when needed, to oxidize elemental Mercury (Hg) to facilitate Hg capture;

3. the mitigation of ammonium bisulfate air heater fouling by preferentially scavenging the $SO_3$;

4. the provision of a simple, low cost way to extend the operating life of SCR catalysts by scavenging the damaging toxic metal Arsenic;

5. the provision of a simple, low cost way to minimize total $CO_2$ emissions from unscrubbed emissions control systems;

6. the provision of a means for recycling industrial byproducts and wastes that also contributes modestly to reducing $NO_x$ emissions;

7. the provision of a cost effective way to restore the marketability of high LOI fly ash; and 8. the provision of a simple, low cost way to capture $SO_3$ and toxic metals using fly ash as the capture medium.

In another aspect of the present invention, fly ash or other thermally stable minerals, particularly those with significant alkali content, are ground, either dry or wet ground, to provide ash particles having a size of the order of about one to two microns or smaller. The finely-ground ash particles are injected, either alone or in combination with the alkaline earth slurries, in quantities and at locations in the flue gas path appropriate to the pollutant to be addressed, generally closer to the furnace outlet because it provides more reaction time. The injection location is not as critical for the capture of toxic metals, which should be effective if injected after the economizer. The use of fly ash is a less costly way to reduce undesirable emissions. Further, fly ash can be a partial substitute for calcium compounds or for activated carbon, and it does not contribute to overall process emissions of $CO_2$.

BRIEF DESCRIPTION OF DRAWINGS

The structure, operation, and advantages of the present invention will become further apparent upon consideration of the following description, taken in conjunction with the accompanying drawings in which.

BEST MODES FOR CARRYING OUT THE INVENTION

The processes herein disclosed relate to the capture of undesirable pollutants that result as products of the combustion process, particularly in coal-fired combustion systems such as those employed in industrial operations or electrical power generating stations. Among the pollutants that are more effectively captured as a result of practicing the processes of the present invention are $SO_2$, $SO_3$, HCl, and toxic metals, such as mercury, selenium, lead, and arsenic. The present processes also relate to reducing the overall amount of $CO_2$ released in the course of capturing the other pollutants.

The processes in accordance with the present invention primarily involve the injection into the high temperature combustion zone of a furnace, where temperatures are in the range of from about 1090° C. to about 1260° C., of a particulate slurry of alkaline earth metal compounds that flash dry or calcine to provide a large number of smaller, very finely sized calcium oxide or magnesium oxide particles having a particle size of about 1 to 2 microns or finer, and that are present as distinct, individual, fine particles, as opposed to agglomerates, and that are available for capturing the undesirable pollutants.

The very finely sized alkaline earth metal oxide particles that are produced within the furnace are sufficiently small that they are carried along with and follow the flow lines of the flue gas that contains the combustion products. Because of their very small size and very low weight, most of the particles act like gas molecules and flow with the flue gas around the heat exchange tube surfaces within the furnace, rather than impinging on the surfaces, as a result of which very little ash buildup occurs on those surfaces.

The primary sources of compounds for providing the metallic oxide particulates include lime, limestone, and other calcium compounds that yield calcium oxide when exposed to high temperatures, such as dolomite. Also suitable are $Mg(OH)_2$, MgO, or other magnesium compounds that yield magnesium oxide when exposed to high temperatures.

A suitable suspension in the form of a slurry can be prepared by finely grinding the alkaline earth metal compounds in an aqueous medium. The fine grinding is carried out in a media mill or another type of fine grind mill to subject the solids to shear forces and reduce their size, to provide an aqueous slurry containing finely ground, suspended solids. The solids in such a slurry can typically have surface areas in the range of from about 4 $m^2/gm$ to about 20 $m^2/gm$. The dispersion concentrations can range from about 20% to about 85% solids by weight, with a preferred concentration range of from about 50% to about 75% solids by weight. Generally, a relatively high solids concentration is preferred, in order to minimize the amount of water that is introduced into the furnace with the solids. However, handling properties and site-specific operating considerations will influence the solids concentrations that are selected for a particular application. An important attribute of the slurry is a very fine particle size and substantial dispersion of the particles, and the avoidance of as many as possible of larger-size agglomerates of the particles.

The desired very fine particle size and the substantial dispersion of the particles throughout the slurry can be achieved by grinding the alkaline earth metal compounds in a media mill in the presence of a dispersant. One type of suitable media mill is available from Union Process Inc., of Akron, Ohio. Suitable dispersants that can be utilized in the grinding process include anionic surfactants and sodium salts of a polycarboxyic add, or polyacrylates. Commercially available surfactants that are suitable include Acumer 9300, available from Rohm and Haas Company, of Philadelphia, Pa., or Darvan 7 or Darvan 811, available from R. T. Vanderbilt Company, Inc., of Norwalk, Conn.

Dispersant concentrations in the slurry can be of the order of from about 0.20% to about 5% by weight. Acceptable results are obtainable with dispersant concentrations within the range of from about 0.25% to about 1.5% by weight.

Another way to obtain the desired high-solids-concentration slurry that contains particles having sizes of from one to two microns involves the preparation of a suspension having as raw materials metallic carbonate, hydroxide, or oxide particles that are then solubilized, as the bicarbonate, and represipitated as carbonates. The raw material can be $CaCO_3$, $MgCO_3$, $Ca(OH)_2$, $Mg(OH)_2$, as well as the oxides of calcium and magnesium. Further, dolomitic limestone and products derived from it, such as lime or lime hydrate, as well as corresponding magnesium compounds, can also be used. The suspension is subjected to a flow of $CO_2$ gas in the presence of an anionic surfactant or of a salt of a carboxylic acid or a sulphonic acid. The $CO_2$ is bubbled through the slurry to react with the suspended materials to form a soluble compound, the bicarbonate, which is then decomposed to form the ultra-fine carbonates.

Those same particle size preparation steps, involving either grinding or solubilization and subsequent reprecipitation, can also be employed to process some high-lime-content fly ash in which the lime content is of the order of at least about 5% of the ash by weight, industrial wastes, such as lime waste from beet sugar processing, or used refractory brick, for use as a pollutant scavenger in a combustion system. Some of those materials typically have an organic content, generally less than about 10%, and when injected into the furnace provide some additional heating value to offset the heat decrease associated with the water contained in the aqueous reagents undergoing calcination. Because the material is added at the location in the gas flow path that is normally the introduction point that is selected to achieve $NO_x$ reduction by what is known as "reburn", some additional $NO_x$ reduction will be realized. The $NO_x$ reduction can be increased further by increasing the combustible content of the injected slurry.

The calcined, reduced size oxide particles that result when the slurry of alkaline-earth-metal compounds are injected into the high temperature region of the furnace are of a particle size of about 0.5 micron or finer. The external surface area of the particles is about 40 times that of a −325 mesh (20 micron) limestone particle and provides about 61,000 times as many oxide particles per pound of material is provided. The result of the presence of such smaller particles in the high temperature region of the combustion zone will be the capture of $SO_x$ and up to 90+% of toxic metals at a stoichiometric ratio of about 1.15 times, or less, of the fuel sulfur content. Moreover, because of their small size and light weight, the very finely sized particles will act within the furnace like gas molecules. They will therefore pass around the heat exchange tubes with substantially fewer of the fine particles impacting the heat exchange tubes, reducing particle deposition on the tube surfaces and thereby improving the effective heat transfer within the furnace.

Figure 1:
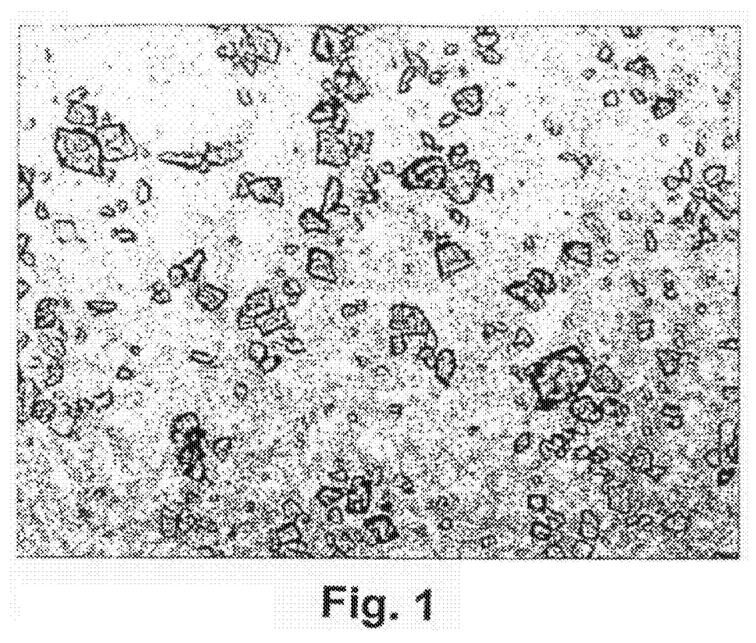
FIG. 1 is a photomicrograph showing the sizes of calcium carbonate particles that were produced by prior art processes.
Figure 2:
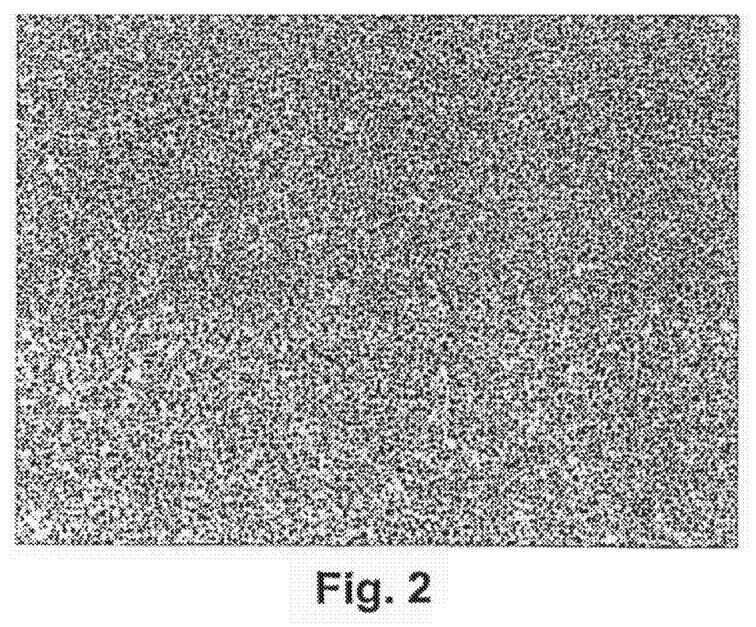
FIG. 2 is a photomicrograph showing the sizes of calcium carbonate particles that are produced by a process as disclosed herein for producing very-finely-sized particles.

FIGS. 1 and 2 are photomicrographs that each represent an area having a width of 0.44 mm and show the vast difference in the sizes of $CaCO_3$ particles depending upon the process utilized. FIG. 1 shows the powder particles that result from the prior art processes that produce a product that is at the fine end of the range of commercial offerings, generally denoted as −325 mesh (5 micron median), and that result from commercially-ground powdered limestone. In that regard, the agglomerates that can be seen in FIG. 1, although composed of a number of smaller particles, are effectively single, large, relatively heavy particles. The particles shown in FIG. 1 are of a finer size (median size of 5 microns) than most commercially available ground particles, which generally fall within the median size range of from about 10 to about 20 microns. Although the prior art refers to the surface area and the pores of such particulate agglomerates, it appears not to appreciate that in actual practice the pores of the agglomerates get plugged by reaction products or by other, smaller particles. Consequently, the effective surface areas of the agglomerates for pollutant capture purposes is reduced, leaving a core of unreacted lime.

FIG. 2 shows the powder particles that result from practicing the processes disclosed herein that provide sub-micron size particles that are essentially agglomerate-free dispersions having a median particle size of about 0.7 microns. The very low fraction of agglomerated stone particles is achieved by applying both shear and dispersant chemicals during the wet preparation of the sub and micron-size stone, and by using spray injectors designed to minimize agglomeration of the dried/calcined particles.

The $SO_2$ concentrations in flue gas are typically of the order of about 2,000 ppm. But the presence of a large number of other gas molecules, roughly 500 per molecule of $SO_2$, tends to limit the contact of a CaO particle with an $SO_2$ molecule. The toxic metals to be captured, such as Hg, Se, and As, are present in flue gas at much lower concentrations, of the order of parts per billion. Thus, reducing the particle size from 20 microns to 1 micron increases the number of $CaCO_3$ particles per pound by about 7800 times, which will significantly increase the probability of a resulting CaO particle finding and reacting with an $SO_2$, an $SO_3$, or a toxic metal molecule in a space that is crowded with other molecules.

Figure 3:
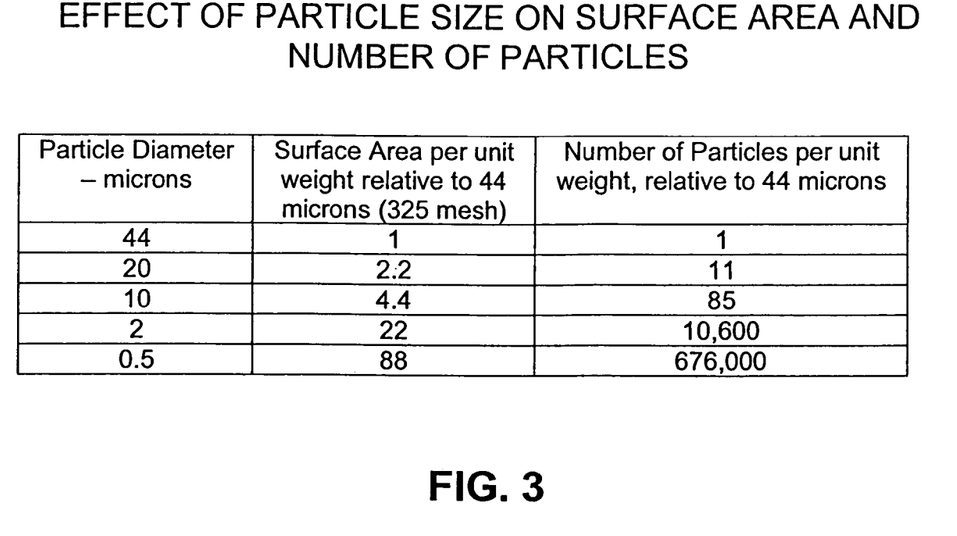
FIG. 3 is a table showing the effect of particle size per unit weight upon the number of particles and their surface area.

FIG. 3 is a table that dramatically shows the effect upon the surface area of the particles and upon the number of particles available for reaction of reducing the particle diameter. Because the large number of very finely sized particles that are produced in practicing the present invention act like gas molecules, they are carried along with and are subject to the same movements and random motions during flow as are other gas molecules that are present, thereby increasing the probability of contact with pollutant molecules. Clearly, increasing the probability of contact increases the probability of more complete reaction. Moreover, the fine size of the particles reduces the chances of a significant unreacted core of lime.

Another approach to increase overall chemical utilization still further is to incorporate in the milled dispersion a small quantity, less than about 5%, of overbased calcium or magnesium compounds, which at 0.005 microns (50 nanometers) contain countless particles per pound. The quantity added will be governed by economics. Since most overbased products are oil based, a surfactant will be needed to make the two materials compatible.

The increase in surface area that results from particle size reduction is not as dramatic as is the increase in the total number of available particles, only a 40 fold increase, but it is significant for pollutant capture performance since it is essentially all external surface area that is available for reaction. The problems reported in most of the prior work occurred where much of the available surface was internal surface area, within surface-connected pores of agglomerated particles. The pores were then plugged by the reaction with $SO_2$, thereby preventing full utilization of the surface area of the pollutant capture material.

Figure 4:
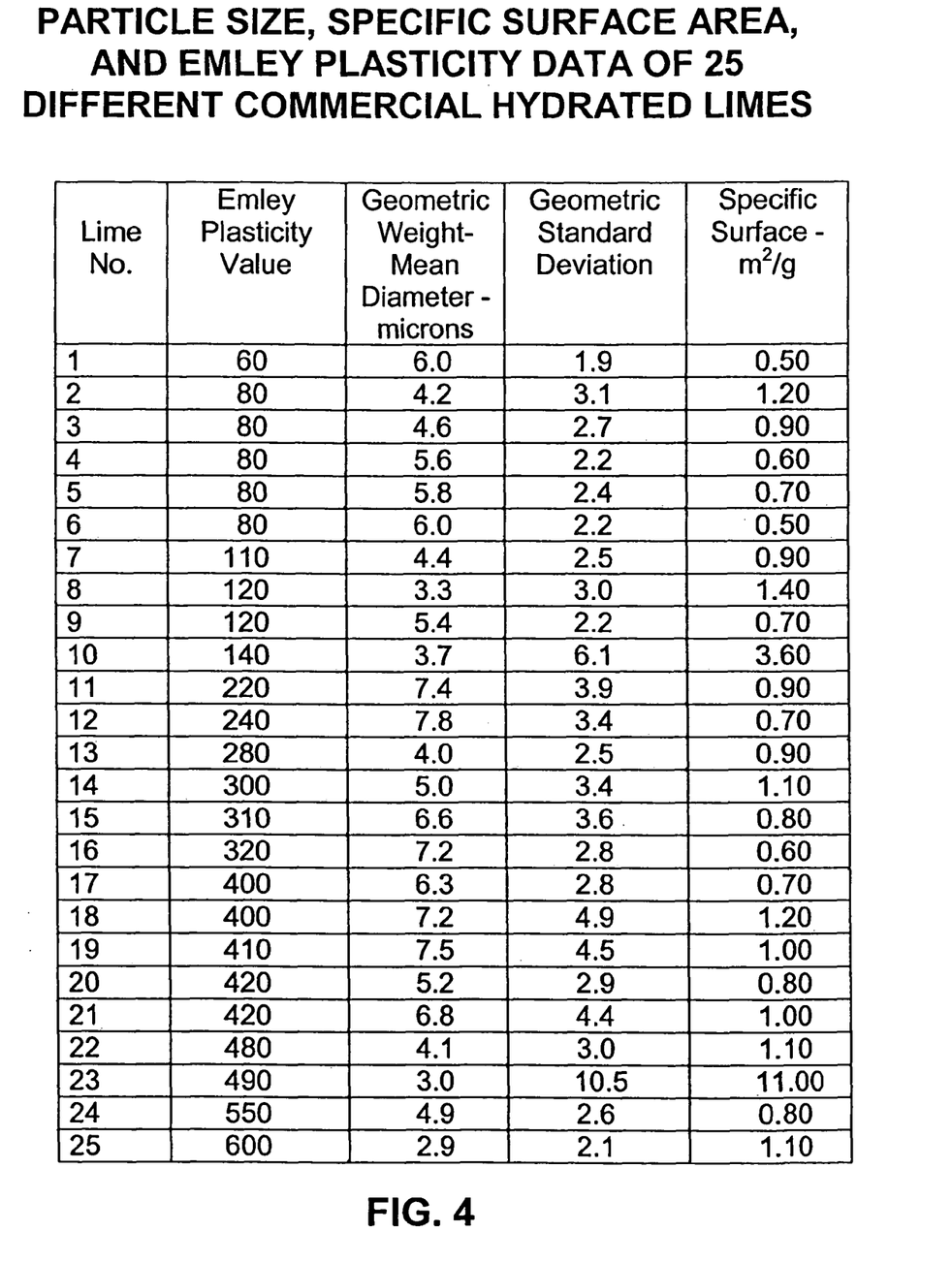
FIG. 4 is a table showing particle size and surface areas for a number of commercially available hydrated limes.

FIG. 4 is a table that is adapted from a table presented in "Chemistry and Technology of Lime and Limestone," by Robert S. Boynton, $2^{nd}$ Ed., 1980, at page 340, and presents the specific surface in $cm^2/g$ rather than in $m^2/g$ for 25 commercial hydrated limes (multiply by $1 \times 10^{-4}$ to convert). The relatively large particle sizes and the relatively low specific surface values for a number of commercially available hydrated limes are shown. Slurries of the hydrates can be reduced to the one to two micron range and deagglomerated by employing milling and surfactants as described above in the context of the present invention.

A further difference between the process in accordance with the present invention and the previous approaches resides in the fact that the larger effective particle size of the agglomerated particles that are present in the previous approaches are likely to result in a significant fraction of those larger particles, having a size of over 4 or 5 microns, impacting and attaching to the surface of a heat exchange tube. As a result, those particles are effectively removed from the gas stream, and they are thereby rendered less available for scavenging pollutant molecules during a significant part of the very short time that particles are within the high temperature region of the furnace. Additionally, the particles that attach to the outer surfaces of the heat exchange tubes result in a coating on the surfaces of the tubes, thereby reducing the heat transfer effectiveness, and consequently reducing the overall operating efficiency of the heat transfer system. In previous full-scale trials, operators found that to reduce heat exchange tube deposits it was necessary to operate the soot blowers nearly continuously, at a significant cost in the energy required and in greater equipment wear and tear.

Figure 5:
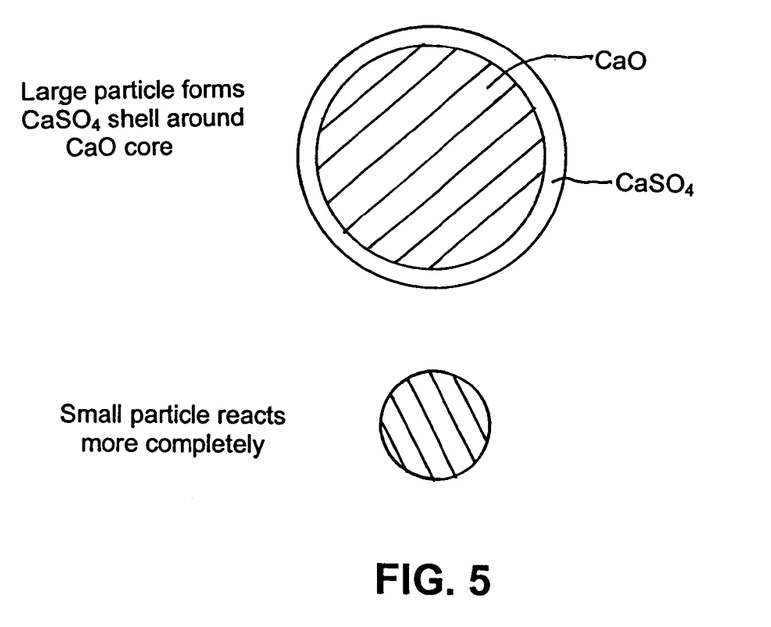
FIG. 5 shows the effect of particle size on pollutant capture effectiveness.

FIG. 5 is a graphical depiction of the effect of particle size on pollutant capture effectiveness. The larger particles characteristic of the previous approaches react with the combustion gases up to a point that is limited by the ultimate formation of a $CaSO_4$ shell around a CaO core. The core portion is therefore no longer available for reaction with the combustion gases. The smaller particles that are provided by the processes disclosed herein, on the other hand, will result in a more complete reaction and pollutant capture, by exposure of the greater surface area of the smaller particles to a larger volume of the combustion gases, because the greater number of smaller particles present a significantly larger total surface area available for reaction before a reaction-limiting $CaSO_4$ shell is formed.

Figure 6:
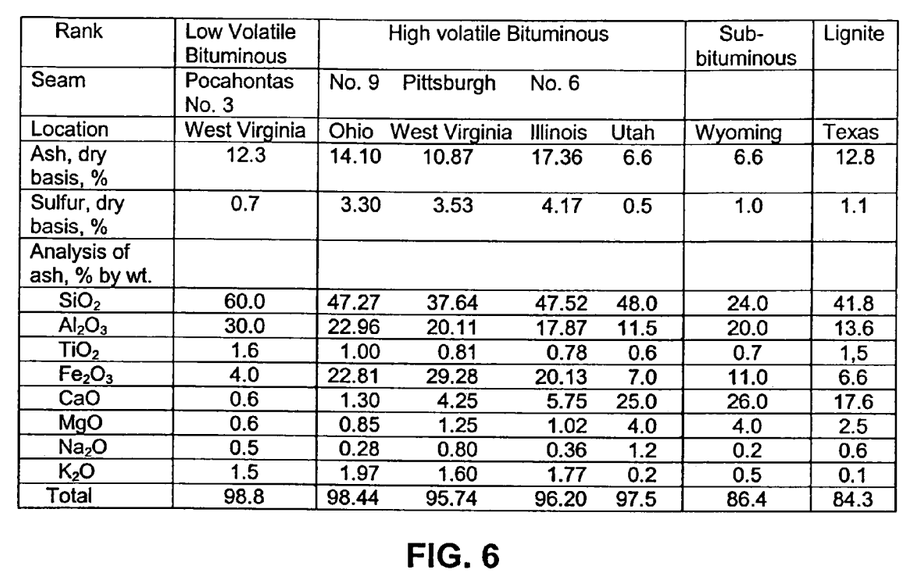
FIG. 6 is a table showing the typical ash composition of representative U.S. coals.
Figure 7:
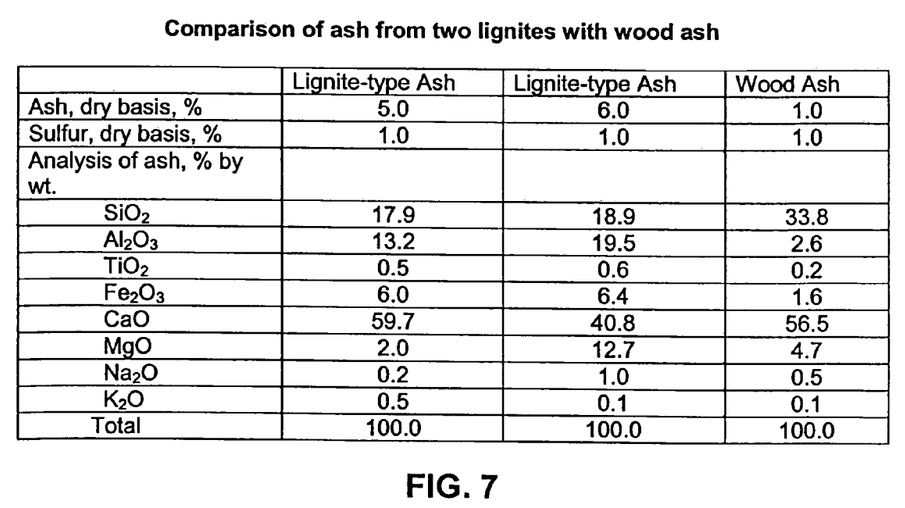
FIG. 7 is a table showing a comparison of the ash composition of two lignites with wood ash.

FIGS. 6 and 7 are two tables adapted from *Steam/Its Generation and Use*, $39^{th}$ edition, Section 15-2, published by The Babcock & Wilcox Company, 1978, showing the typical ash content and chemistry of some U.S. coals and lignites. They show that some forms of ash, particularly those from the Western states, can be quite high in CaO. Therefore, if the ash particle size is reduced and is activated as disclosed herein, such materials can potentially be useful and economic sources of pollution control reagent both for systems not having scrubbers as well as those having scrubbers. Clearly, reinjecting processed high calcium ash would be more appropriate for injection in systems not having scrubbers, while similarly processed low calcium ash would be useful to capture $SO_3$ and toxic metals in systems having scrubbers.

Further in connection with $SO_2$ capture, it is known that humidifying the flue gas ahead of the electrostatic precipitator to bring the dew point to within about 11° C. to about 17° C. of saturation significantly enhances $SO_2$ capture. The added moisture condenses on the fine ash and lime particles under those conditions to yield a liquid film that stimulates the acid/base reaction. The multiplicity of finely-sized particles achieved in the course of carrying out the processes of the present invention performs that function much more effectively than those relatively fewer, large agglomerates from dry powder that do manage to continue through the system to the cooler regions of the boiler.

As was earlier noted, utilizing the deagglomerated product that is produced by carrying out the present invention reduces the potential for ash deposits in the convective section of the boiler. The dramatic increase in CaO particles thus also significantly increases the chances of preventing corrosive attack of the high temperature tube surfaces by semi-molten ash particles. The net effect is to make those ash particles less sticky and less prone to attach themselves to and to build up on the surfaces of the heat exchange tubes.

Other benefits of the agglomerate-free, fine particle chemical addition in accordance with the present invention include the capture of almost all of the $SO_3$, which allows lowering the boiler exit temperature without encountering the fouling and corrosion of cold end equipment by either ammonium bisulfate or sulfuric acid. Further, in addition to the net increase in system thermal efficiency and reduced maintenance, the lower temperatures and reduced gas flow will enhance both precipitator efficiency and fan capacity.

Additionally, utilizing the processes in accordance with the present invention will result in the dust collector burden to be about half that experienced in known processes utilizing −325 mesh lime or limestone. Because $CaSO_4$ is less detrimental to precipitator performance than is free CaO, the significant increase in CaO utilization realized with the present invention serves to minimize the adverse impact of a larger particle size limestone injection on the precipitator performance. As mentioned above, air heater fouling and corrosion is also minimized, permitting the lowering of flue gas exit temperatures. That step has the potential both to modestly enhance system heat rate and also to reduce gas volume to the precipitator, which enhances precipitator efficiency and reduces fan power demand. The total solids burden (ash+$CaSO_3$ or $CaSO_4$+ CaO) and the operating specifications of the particular electrostatic precipitator will determine if the advantages of reduced gas volumes and reduced ash temperatures are sufficient to offset the disadvantage of higher resistivity on the particular precipitator, and will influence whether supplemental dust treatment or collection capacity is needed.

It is known that increasing the submicron fraction of the dust burden can have both positive and negative impacts on the operation of the ESP. Moderate increases in the number of small charged particles increase the electric field close to the electrode, which will improve particle collection of all particle sizes. If the number of particles smaller than 1 micron is too large, the ESP current will be reduced to the point where charging and collection is not as effective. Thus, for any given boiler-ESP combination, a balance would have to be struck between the amount and size of the fine particles employed to capture $SO_2$ in the ESP with maximum efficiency, while limiting the number of submicron particles to that amount that will enhance rather than inhibit particulate collection performance. Alternatively, to achieve those same positive impacts on the ESP, one can target a more optimal $SO_x$ capture that can be achieved with sub-stoichiometric injection. Another alternative is to employ a commercially available ash conditioning system that agglomerates the fine particles, or to add humidification just before the entrance to the ESP.

The alkaline-earthbased chemicals that are injected into the combustion zone to capture SOX and toxic metal pollutants can impede the collection of particulate emissions in some electrostatic precipitators. But by slightly modifying the composition of the injected chemicals, the negative impact of the alkaline-earth-based chemicals can be mitigated, and the performance of the ESP can be enhanced. In that regard, co-injecting modest amounts of alkali compounds to counteract the adverse impacts of the alkaline-earth-based reagents was not previously recognized as an option to address that problem. Instead, the previous approach focused on providing additional systems, such as humidifiers, and ammonia and $SO_3$ fly ash conditioning equipment, which present retrofit problems and increase the capital costs in older systems.

As earlier noted, the addition of finer particle sizes yields efficient $SO_x$ capture at treatment ratios that are much closer to stoichiometric than those achieved previously, thereby allowing the power plant operator to lower the furnace exit gas temperature, to decrease gas volume and velocity through the ESP, and to increase the capture efficiency. The lower exit gas temperature is dependent upon neutralizing any $SO_3$ present in order to avoid corrosion, and that temperature reduction can be achieved by heat exchange in new installations, or by spray cooling in retrofits, such as disclosed in U.S. Pat. No. 4,559,211.

If the system temperature can be lowered, such as by turning off steam air preheater coils, and utilizing an oversized ESP, those factors together with the reduced ash burden afforded by the more efficient $SO_2$ capture technology disclosed above can be sufficient to ensure compliance with particulate emission requirements. If such temperature lowering capability does not exist in a particular power plant, spray cooling can be implemented by incorporating a humidification system and sacrificing some energy efficiency. That approach was used in the Limestone injection Multiple Burner (LIMB) demonstrations funded by the U.S. Department of Energy and are of some value, but that technology has not been implemented, largely because of the poor reagent utilization.

Another approach for addressing the ESP problems encountered when injecting alkaline-earth-based chemicals includes the injection of various chemicals into the lower temperature regions of the boiler, rather than into the higher temperature regions. That approach serves to modify the electrical characteristics of the ash, and is disclosed in U.S. Pat. No. 4,306,885. It includes the injection of gases such as $SO_3$ and $NH_3$, combinations thereof, and various ammonium and sodium phosphorus compounds. The addition of sodium compounds to the fuel is discouraged because most such compounds are relatively low melting and can cause serious slagging or fouling in the high temperatures regions of the boiler. Consequently, injection of such compounds into the flue gas stream at temperatures below about 900° C. is specified. However, such additions, whether gaseous, liquid, or solid require investment in and maintenance and operation of separate feed equipment. The quantifies of the various chemicals needed are generally quite small relative to the amount of ash or coal fired, i.e., in the range of about 10 lb/ton ash and about 1 lb per ton of coal, respectively, for a 10% ash coal.

Industry practice when injecting modest amount of chemicals, such as a limestone dispersion, is to dilute the product with water at the point of injection to enhance distribution in the flue gas stream. For limestone, that practice has the additional advantage of evaporative cooling and slightly delaying the calcination, which serves to minimize overburning of the CaO.

Ideally, the simplest mode of supplying the ash conditioning reagent is to incorporate it in or to coinject it with the limestone dispersion at the higher temperature. There are a number of alkali compounds capable of modifying ash electrical properties that are high melting and suitable for incorporation in or co-injection with the limestone dispersion. They include sodium and potassium phosphate (tribasic), lithium silicate, and the aluminates of all three major alkali metals (Na, K, and Li). The phosphates are believed to provide an agglomerating effect downstream to complement the resistivity modifications that result from the introduction of the alkali metals.

Another way of supplying the needed alkali to condition the $CaSO_4$ product of the capture of SOX by stone-derived lime is to employ alkali-containing surfactants such as sodium, potassium, or lithium polyacrylates as dispersants in the preparation of the stone slurry. The quantity of dispersant employed will vary with the solids loading and particle size of the suspension, but it should be in the range of from about 0.25% to about 2.0% of the product, by weight The amount of alkali contributed to the $CaSO_4$ conditioning will vary with the surfactant composition. It is likely to be sufficient to have a conditioning effect, but it can be supplemented with the other sources if more conditioner is needed.

The amount of the $CaSO_4$ conditioning agent to be added is in the range of from about 0.005% to about 5% of the weight of the injected stone. Because the alkalis that are the actual slagging agents represent less than 30% to 50% of the conditioning reagent by weight, the total deposit formers supplied is far less than the 3% or 4% sodium "rule of thumb" slagging threshold for boilers. Treatment rates will be dependent on the relative quantities of sulfur and ash in the fuel, the stoichiometric efficiency of the limestone, which is a function of particle size, the effectiveness of the distribution upon injection, and the design and condition of the ESP. It should be noted that from a practical operating standpoint, the quantities of alkali added with the ash conditioning agents is well below the levels at which they actually pose slagging problems, and that the CaO resulting from the stone injection tends to mitigate any slagging problems.

A further beneficial result of utilizing the processes disclosed herein is better carbon burnout because of the resulting cloud of fine, reflective particles, which also allow for modest reductions in excess air, for reduced $NO_x$ formation, and for increased unit heat rate. A previous report by the inventor disclosed some such benefits from the injection of a coarser 3 micron $Mg(OH)_2$ dispersion, but the use of the much finer size particles and the larger reflective cloud to restore the marketability of high LOI fly ash was not envisioned. The reduction of unburned carbon in the fly ash from as much as 16% to under 5% restores the marketability of the ash.

Still another benefit of the present invention is a dramatically lower $CO_2$ release per unit of $SO_2$ captured. The higher stone utilization of the present invention brings the FSI emission, 2.5 tons $CO_2$ per ton $SO_2$, close to the 0.7 tons $CO_2$ per ton $SO_2$ achieved in a wet limestone scrubber. That result compares with nearly 14 for the previous furnace injection approaches. Those numerical values take into account both the $CO_2$ released from the stone and that from the fuel used to calcine it. Clearly, to the extent that finely-ground fly ash can take the place of limestone, the $CO_2/SO_2$ ratio will be that much closer to that for limestone scrubbers.

Another difference between the invention as disclosed herein and previously-disclosed approaches is the ability to provide a truly multipollutant FSI process by grinding the stone or ash in a weak ammonium solution, such as urea, along with a surfactant, such as ammonium polyacrylate or ammonium sulfonate, to facilitate high solids loading. The inherent stability of a fine-particle-size $CaCO_3$ together with the reduced settling afforded by the high solids, overcomes the handling and pluggage problems that were encountered in previous attempts to combine −325 mesh stone and ammonium solutions. The addition of urea, even though in a small amount, could necessitate a substitution of ammonium polyacrylate for the sodium polyacrylate dispersant in order to assure a stable, handleable dispersion.

Example

The following example is for a coal-fired boiler in an electrical power generating station, but the technology is applicable to the use of any fuel that results in combustion products that contain undesirable sulfur oxide, nitrogen oxide, acids, or toxic metal compounds. Other types of combustion systems that can benefit from the disclosed processes include industrial boilers, trash incineration systems, residual oil, and bio-mass-fired combustion systems.

A 100 MW utility boiler burning 1.3% sulfur Midwestern coal purchases $SO_2$ credits costing \$575/ton to offset the emission of about 25 tons of $SO_2$/day. It operates with flue gas exit temperature of about 180° C. to avoid $SO_3$ corrosion of outlet duct and ESP cold end equipment. Station management is evaluating options for complying with toxic metals regulations. The station has tested furnace injection of powdered limestone that has an effective particle size of 25 microns at a Ca/S ratio of 2.4, but has been able to capture only 50% of the $SO_2$, even when humidifying the flue gas to boost performance. That trial has not resulted in commercial application because of the significant increase in ash burden, of the need for near continuous soot blowing to maintain heat transfer, and of the adverse impact on electrical properties of the ash, which resulted in the boiler being out of compliance on particulate emissions. During the $NO_x$ generation season, the station employs a SNCR system and injects a urea solution, which effectively controls the $NO_x$, but the associated $NH_3$ slip periodically fouls the air preheater, thereby necessitating outages every month or two to allow cleaning of the air preheater. Future regulations will require year-round $NO_x$ control, Hg emission control, and a further reduction in $SO_2$ emissions.

A trial is then conducted utilizing a 75% $CaCO_3$ aqueous dispersion that is produced by wet grinding of limestone that is treated (by addition of a surfactant?) to avoid agglomeration of the reagent particles. The average particle size is about 1 micron. The dispersion is injected into the furnace through multiple injection ports that are selected using computer modeling in order to optimize the distribution of the dispersion across the combustion zone. The dispersion is at a Ca/S ratio of 1.15 and is injected near the furnace outlet, where the gas temperatures are within the range of from about 1000° C. to about 1100° C. The result is the capture of about 70% the $SO_2$ with 50% less chemical feed than was required with the initial powdered stone with its larger, agglomerated particles. That result is accompanied by a virtual elimination of the $SO_3$-related fouling and corrosion problems. Moreover, about 90% of the toxic metals are captured. Additionally, about a 50% reduction in convective pass soot blowing is achieved because the ash that is produced is less sticky and more readily removed. The reduced ash quantity relative to the previous approaches allows the unit to meet stack emission regulations even though some modest back corona is still encountered in the first section of the precipitator.

A boiler owner/operator might conclude that the approach disclosed in the example given above requires a relatively expensive reagent, because of the required fine-grinding costs for the dispersions involved. However, the accompanying relatively-low capital investment, as well as the relatively short construction time required to install boiler injectors and system hardware in the minimal space required to retrofit this new process at a plant site, does provide an overall advantage as a multi-pollutant control technology with considerable operational flexibility. The technology benefits are compared/evaluated to the other emission-control system options available for a site-specific situation. The new-art technology is justified/selected based on availability and a life-cycle cost that is economically viable for the present as well as the future remaining life of the generating asset On FGD-equipped systems where the capture of $SO_3$ and toxic metals, rather than $SO_2$, are the primary objectives, magnesium chemicals are preferred because they do not compete for the $SO_2$ pollutant. Similarly-sized, very fine fly: ash particles can be a better option than, or a partial substitute for, magnesium compounds. For those objectives, low calcium fly ash or magnesium compounds can be injected after the economizers, instead of at the in-furnace transition from radiant to convective heat transfer near what is commonly referred to as the "nose" of the furnace. The "nose" is the region adjacent to the furnace outlet, where the heat transfer mechanism undergoes a transition from radiant heat transfer to convective heat transfer, as well as the superheaters and reheaters that make up the convective pass, and the economizer, where the incoming water is preheated before passing into the furnace heat exchange tubes for vaporization as steam. For purposes of this invention, the finely sized alkaline earth compounds are injected through ports in the upper furnace wall, generally close to the exit of the furnace exit.

The above are the preferred treatment options on systems that include scrubbers, because the total treatment reagent required is significantly less. However, those compounds do not operate to scavenge $SO_2$ from the flue gas stream, which instead is carried out in the scrubber. If the fly ash has a significant calcium content, which can be present naturally or can be added, it can optionally be introduced into the furnace combustion zone to scavenge $SO_2$ in systems that do not include scrubbers.

The preparation of suitable finely-sized fly ash particles is influenced by the ash chemistry, by the emissions control systems that are present, and by which pollutants are being addressed. If the plant has existing FGD capability and the objectives are primarily the control of $SO_3$ and toxic metals, the preparation involves withdrawing a small fraction of the total fly ash, less than about 5%, from the collection hoppers, passing it through a jet mill or other type of mill to reduce the particle size of the ash to a micron or less, and then discharging the mill output back into the boiler or ducts. The solubilization and reprecipitation size reduction technique can also be applied to process the high lime fraction of high calcium content ash, either with or without wet milling of the insoluble component.

The quantity of fly ash that is of reduced particle size can be small because the $SO_3$ and toxic metals concentrations in the flue gas stream are in the low ppm range, and also because reducing a 20 micron particle to 0.5 micron size increases the number of particles by more than 61,000 and also multiplies the surface area by factor of 40. Because the increase in ash burden is small, the impact on the performance of the particulate control device will generally be manageable. Media mills (wet or dry) are viable alternatives to the jet mill, which can be powered by steam or air. In many instances, a steam-powered jet mill is preferable to a compressed air system because steam is readily available and is less expensive at a power plant, and also because the moisture injected would enhance acid adsorption and help ESP performance. Wet systems are slightly more cumbersome and could pose a very minor heat rate penalty.

The result of utilizing the finely-sized particles provided by the present invention include a dramatic increase in ash particles, and consequently in ash surface area, thereby providing enhanced adsorption of the $SO_3$ and of toxic metals. That result is achieved at a low energy cost and at a relatively low capital investment, while simultaneously eliminating or significantly reducing the need for purchased chemicals. Increased fly ash surface area will not only enhance $SO_3$ absorption, it will also stimulate more acid neutralization as a result of the alkaline materials present in the ash. In the few instances where the adsorbed acid inhibits constructive use of the ash, adding a modest limestone supplement to the mill input material would suffice.

Costs can be offset or converted into a net benefit because the capture of the $SO_3$ will reduce corrosion and fouling, and will make it feasible to lower the air heater exit temperature, thereby increasing fuel efficiency.

Grinding ash from the economizer hopper, or bottom ash, is preferable to utilizing ash from the precipitator hopper, because it avoids ash recirculation and potential increase of pollutant concentrations in the flue gas stream. For power plants without high efficiency FGD systems, the ground ash can be injected into the upper furnace region to scavenge $SO_2$ if the ash has a significant CaO content. For a 1% Sulfur coal, ash having a CaO content of about 12.5% would provide the stoichiometric quantity that would be needed. Thus, many Midwestern coals with below stoichiometric CaO levels in the ash can still be beneficial, while Western coals with high CaO content could be more useful, if they were readily available.

Previous efforts at capturing undesirable pollutants have focused on adding purchased chemicals that have or yield a high surface area needed to absorb the $SO_3$ and toxic metals. In utilizing fly ash, the present invention, in contrast, utilizes what is normally a waste product or low value byproduct of the power plant in order to reduce the need to purchase supplemental reagents.

Another aspect of pollution control of carbonaceous-fuel-fired combustion systems, primarily coal-fired facilities, is the matter of protection of the selective catalytic reactors (SCR's) from what has been referred to as "arsenic poisoning." Experience has shown that typical catalyst life in systems burning a wide range of coals is only about three years. Not only is catalyst replacement expensive (amounting to millions of dollars), but $NO_x$ reduction performance deteriorates steadily over that time period. Many coals, particularly Eastern U.S. coals, contain significant amounts of arsenic. The arsenic in the coal forms gaseous $As_2O_3$ as one of the products of combustion, which causes a reduction in the activity of the catalyst for its intended purpose of reducing $NO_x$ emissions Because the replacement of SCR catalysts is an expensive undertaking, it is therefore desirable to capture as much of the gaseous $As_2O_3$ as solid particulates as is possible before the arsenic-based vapor comes into contact with the catalyst, and before it is emitted to and pollutes the environment. Catalyst suppliers currently recommend adding sufficient limestone, either as rock or as powder, on the coal supply belt to bring the CaO content of the fly ash to at least 3%. Depending upon the mineralogy of the ash, that can involve a considerable limestone addition rate, a significant feed system investment, and significant ash disposal problems.

When alkaline earth carbonates, such as $CaCO_3$ or $MgCO_3$, are introduced into the furnace in the slurry form as described earlier herein to form the ultrafine CaO and MgO particles for capturing $SO_2$, those particles are also useful for capturing the $As_2O_3$. Other compounds, such as those yielding ZnO upon thermal decomposition, can also be effective, but are likely to be more costly. But when CaO is utilized as the capture medium a greater amount of reagent is required, because of the propensity of CaO to also capture the $SO_2$. Thus, that portion of the CaO particles that effectively captures the $SO_2$ in the combustion products by combining with the $SO_2$ is therefore unavailable to react with the $As_2O_3$, resulting in a lower $As_2O_3$ capture effectiveness and a need to employ higher reagent dosages to protect the SCR catalyst than would be needed with MgO or other high surface adsorbents. Similarly, the "overbased" form of reagent can be much more effective than the ground or precipitated types in capturing the toxic metals that are usually present in the ppb range, because of the far greater number of particles per pound. The choice of reagent type, or combinations thereof, is an economic decision based on whether the lower dosage of the overbase is sufficient to offset its 4 or 5 times higher cost per unit weight.

Unlike CaO, however, MgO does not readily capture $SO_2$. Consequently, when $MgCO_3$ or $Mg(OH)_2$ is introduced in slurry form to provide the fine MgO particles, there is little competition for the MgO between the $SO_2$ and the toxic metals. As a result, the quantity of reagent required to capture the arsenic is orders of magnitude less with the magnesium compounds. That is true even though the chemical has the additional benefit of reducing fouling and ESP problems. Further, much of the $SO_3$ that is formed in the SCR will also be captured, which thereby serves to minimize the visible plume problem often incident to SCR/scrubber-equipped combustion systems.

In addition to the desirability of capturing the arsenic to minimize catalyst poisoning, it is also desirable to capture the toxic metal mercury. In that regard, the mercury that is present in the combustion products from Eastern coals is in the more readily sorbed "salt" form. In the Western coals, on the other hand, the mercury tends to be in the more difficult-to-capture elemental form. One way to capture the mercury present in Western coals, as well as in low-chloride-content Eastern coals, is to introduce with the coal modest amounts of chloride or of other oxidizing compounds, such as ozone or peroxides, to facilitate the mercury capture. The chloride addition allows the conversion of elemental mercury to a salt that can be captured in the dust collectors of the coal-fired plants.

The introduction of chlorides or other oxidizing compounds is especially desirable when Western U.S. coals are utilized, because they have a lower intrinsic chloride content. To date, most applications have involved adding the chloride on the coal supply belt. But the additional chloride can be more effectively provided by adding it to the carbonate dispersion discussed earlier, which is injected into the combustion zone of the furnace. Chloride can be introduced to increase the equivalent effective chloride level to approximate that in Eastern coals, about 0.5% chloride by weight of coal, but better distribution of the chloride in the gas stream in the combustion zone should achieve the mercury oxidation with less chemical than is needed to be applied to the coal supply belt. The chloride can also be added separately at the point of the slurry injection and in the form of a salt solution. For example, at the equivalent of a $MgCl_2$ addition rate of 500 ppm on coal, the $MgCl_2$ would be only about 0.8% of the weight of the $CaCO_3$ that would be needed to capture a significant amount of $SO_2$ at a Ca/S ratio of 1.5. Such a small amount could be sufficient to allow incorporation of the chloride salt in the dispersion without adversely impacting the stability of the carbonate dispersions. Including the chloride salt in the dispersion can also provide a modest degree of freeze protection.

On the other hand, the stability of the dispersion composition can be adversely impacted by the addition of chloride to the dispersion. One way to avoid a dispersion stability problem is not to incorporate the chloride in the dispersion directly, but to provide dual feeds to the injection ports, one feed being the carbonate dispersion and the other feed being the chloride. Another approach is to combine the carbonate dispersion with urea to be able to provide in a single solution a true multi-pollutant-capturing product. The combination will require a reformulation of the slurry to adjust for the incompatability of the sodium-based dispersants and urea, and will necessitate a change from a sodium polyacrylate dispersant to another dispersant, such as ammonium polyacrylate, in order to assure a stable dispersion.

It will therefore be apparent that the present invention provides significant flexibility and advantages in connection with the control of undesired $SO_x$, $NO_x$, and acids, as well as toxic metals emissions, when it is utilized in carbonaceous-fuel-fired combustion systems.

A first advantage of the present invention is that the practice of the disclosed invention results in a significant reduction of the discharge of undesirable pollutants. The reduction is achieved with relatively simple modest cost equipment and is effected within the furnace by the reaction of the pollutants with a particulate material, or the adsorption of the pollutants on the surface of a particulate material. The disclosed particulate materials that achieve the control of undesired emissions can be derived from limestone, magnesite, alkaline-earth-containing wastes or byproducts, fly ash, and combinations thereof. Those materials are relatively inexpensive, and their preparation as finely-sized dispersions in the manner described herein avoids the high costs associated with ultrafine, dry grinding of limestone. Moreover, the pollutant removal efficiency provided by a large number of unagglomerated, finely-sized particles is not dependent upon the existence of particles having pores, as in some previously disclosed approaches. And as earlier noted, the pores of such porous particles can easily become plugged, which thereby reduces the effective surface are of the particles and limits the access of the gaseous or vaporized pollutants to the inner core regions of the particles. Because of the resultant reduction of available effective particle surface area, the pollutant capture effectiveness of such previous processes is significantly reduced.

A second advantage of the disclosed invention is that it results in increased combustion efficiency and reduced $CO_2$ emissions from combustion systems lacking environmental controls. Consequently, the quantity of unburned carbon that is otherwise normally contained in the ash is reduced by the reflectivity of the cloud of oxide particles released by injection of the finely ground reagent dispersion. And the combustion process requires less excess combustion air, thereby reducing $NO_x$ emissions. It also results in minimizing ash fouling in the furnace, as well as reducing the deposition of ammonium bisulfite or sulfuric acid in the air preheater.

A third advantage of the disclosed invention is that it provides a low-capital-cost process that permits economical stripping of $SO_x$ and toxic metals pollutants from combustion gas streams. It also enables the capture of $NO_x$ along with the other pollutants. Furthermore, the resulting combustion gas stream cleanup can be achieved with fewer undesirable side effects, such as hard-to-handle ash deposits, overburdened dust collectors, visible stack plumes, and the like. And the hard piping and safety devices required when overbased compounds (oil-based magnesium compounds) are utilized are therefore rendered unnecessary.

In summary, the disclosed invention provides a new, more effective FSI technology that can be combined with other pollution control techniques as process enhancements.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

Industrial Applicability

The present invention is applicable to the control of undesirable pollutant materials arising as a result of combustion in carbonaceous-fuel-fired combustion systems, such as electrical utility boilers, incinerators, and high temperature combustion reactors.

The invention claimed is:

1. A process for controlling combustion system emissions from carbonaceous-fuel-fired combustion systems, said process comprising the steps of: preparing an aqueous slurry of particles selected from the group consisting of alkaline earth carbonates, alkaline earth hydroxides, alkaline earth oxides, fly ash, and other alkaline earth containing byproducts or wastes, and mixtures and combinations thereof, wherein the slurry has a solids content of from about 20% to about 85% by weight and the particles in the slurry are distinct, individual, substantially agglomerate-free particles and have a median particle size of less than about 3 microns; injecting the slurry into a furnace combustion region while minimizing agglomeration and at a location within the furnace combustion region having a temperature of from about 1090° C. to about 1260° C. to flash calcine the particles to smaller, discrete, substantially non-agglomerated oxide particles having a particle size of less than about 0.5 microns, to react with and to capture $SO_2$ and toxic metals present in the combustion zone, wherein about 5% by weight of fly ash is passed through a mill to reduce ash particle size to less than about 1 micron, and discharging the mill output into the combustion zone to capture $SO_3$ and arsenic and mercury present in the flue gas.

2. A process for controlling combustion system emissions from carbonaceous-fuel-fired combustion systems, said process comprising the steps of: preparing an aqueous slurry of particles selected from the group consisting of alkaline earth carbonates, alkaline earth hydroxides, alkaline earth oxides, fly ash, and other alkaline earth containing byproducts or wastes, and mixtures and combinations thereof, wherein the slurry has a solids content of from about 20% to about 85% by weight and the particles in the slurry are distinct, individual, substantially agglomerate-free particles and have a median particle size of less than about 3 microns; injecting the slurry into a furnace combustion region while minimizing agglomeration and at a location within the furnace combustion region having a temperature of from about 1090° C. to about 1260° C. to flash calcine the particles to smaller, discrete, substantially non-agglomerated oxide particles having a particle size of less than about 0.5 microns, to react with and to capture $SO_2$ and toxic metals present in the combustion zone, wherein fly ash is withdrawn from collection hoppers and is milled to a particle size of less than about one micron and is discharged into the furnace combustion region.

3. A process for controlling combustion system emissions from carbonaceous-fuel-fired combustion systems, said process comprising the steps of: preparing an aqueous slurry of particles selected from the group consisting of alkaline earth carbonates, alkaline earth hydroxides, alkaline earth oxides, fly ash, and other alkaline earth containing byproducts or wastes, and mixtures and combinations thereof, wherein the slurry has a solids content of from about 20% to about 85% by weight and the particles in the slurry are distinct, individual, substantially agglomerate-free particles and have a median particle size of less than about 3 microns; injecting the slurry into a furnace combustion region while minimizing agglomeration and at a location within the furnace combustion region having a temperature of from about 1090° C. to about 1260° C. to flash calcine the particles to smaller, discrete, substantially non-agglomerated oxide particles having a particle size of less than about 0.5 microns, to react with and to capture $SO_2$ and toxic metals present in the combustion zone, wherein fly ash containing alkaline earth oxides of at least about 5% by weight is withdrawn from a collection hopper and is dissolved and reprecipitated to yield particles having a particle size of less than about 1 micron and is discharged into the furnace combustion region.

* * * * *